United States Patent Office 3,209,318
Patented Sept. 28, 1965

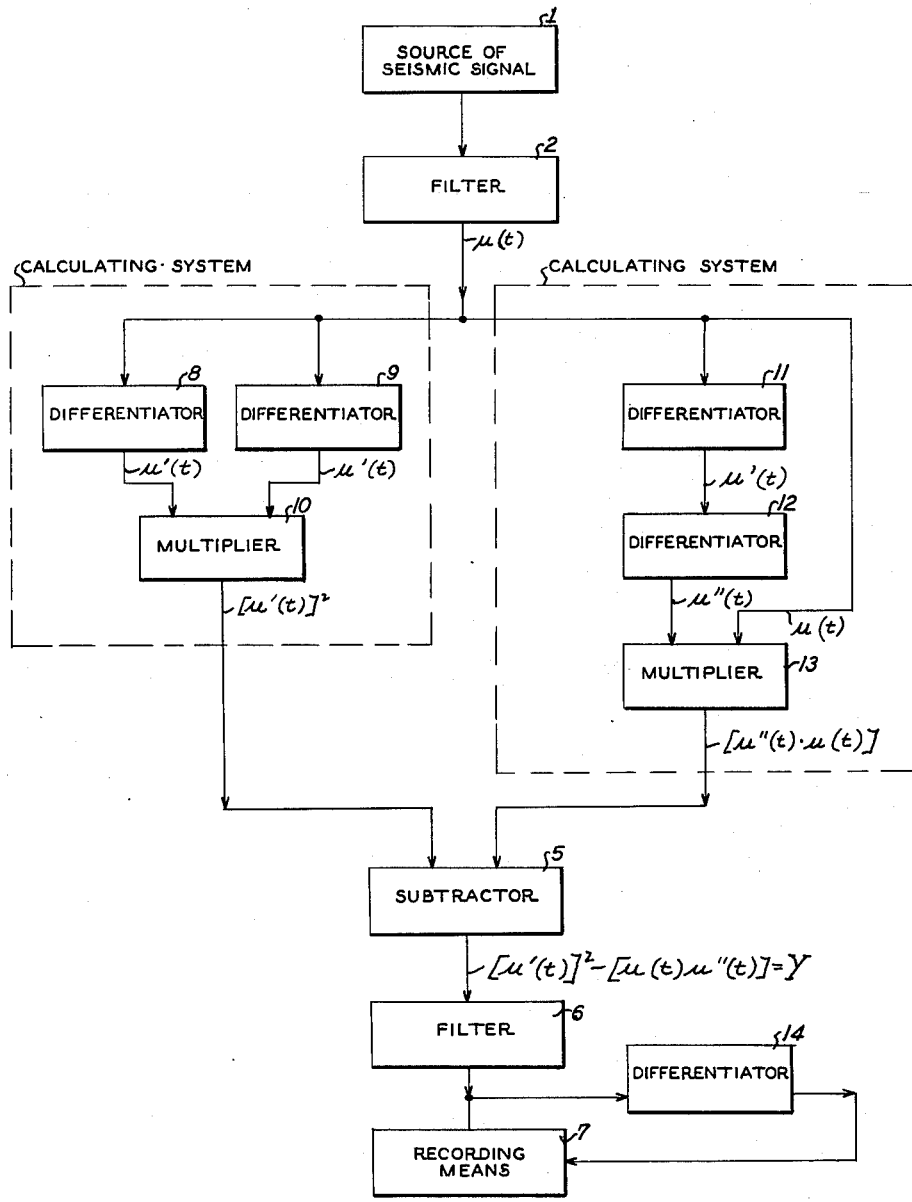

3,209,318
METHODS AND MEANS FOR ANALYZING AND EXAMINING SEISMIC RECORDS
Wladimir Baranov, Chatenay-Malabry, France, assignor to Compagnie Generale de Geophysique, Paris, France, a corporation of France
Filed Apr. 25, 1961, Ser. No. 105,482
Claims priority, application France, May 17, 1960, 827,390
3 Claims. (Cl. 340—15.5)

This invention relates to improved methods for examining seismic records and to apparatus for carrying out the methods.

It is well-known that seismic prospecting relies chiefly on the study of the reflections and refractions of elastic waves in the ground, which waves are produced by the detonation of explosive charges or by any means for generating vibrations in the ground.

It is also well-known that seismographs or geophones record not only the useful signals produced by such reflected or refracted waves, but also a large amount of parasitic signals or stray signals which make examination of the seismograms difficult.

My invention has for an object the removal of the major part of said parasitic signals, while allowing only those signals which are actually of interest to remain in the record.

Experience has shown that seismic records which are the most difficult to analyze are those in which the useful signals are, so to speak, obscured by a background of substantially sinusoidal vibrations, that is: vibrations of a sinusoidal type, the amplitude of which varies slowly with time.

It is a further object of the invention to eliminate from seismograms such substantially sinusoidal vibrations.

According to my invention, the seismogram supplied by a geophone or geophones is transformed. In particular, of the voltage $u$ across the terminals of the geophone as a function of time $t$ is transformed into another function $Y$ of time $t$, corresponding to the application of the following formula:

$$Y(t) = u'(t)^2 - u(t)u''(t)$$

wherein $u'(t)$ and $u''(t)$ designate respectively the first and the second derivative with respect to time $t$ of the voltage $u(t)$.

If the voltage $u(t)$ varies in accordance with a substantially sinusoidal law, the function $Y(t)$ is a constant which is proportional to the square of the amplitude and to the square of the frequency. It is well-known that the energy of a vibratory movement is proportional to the square of the amplitude and, consequently, the transformed function $Y(t)$ supplies a measure of the energy collected by the geophone. Thus, each time a "packet" of energy reaches the geophones after leaving the ground, the substantially constant value of $Y(t)$ is subjected to a sudden increase which may be readily detected. It should be noted that, when recording, as a function of time, the energy received by the receivers in response to seismic vibrations, the energy is localized practically at well determined (clearly defined) instances, these being the instances at which the reflected waves arrive. In other words, the reflected waves show up on the receivers mainly at given instances in the form of energy concentrated at said instances; these concentrations are called "packets of energy."

On the other hand, it is a well-known fact that the arrival of a reflected wave may modify the pseudofrequency of $u(t)$. When analyzing a recording received by the Fourier method of components, it should be noted, in a general way, that the frequency spectrum comprises a component frequency which is entirely dominant, i.e., which has the greatest amplitude.

This particular frequency is defined as the "pseudofrequency." Said modification is more readily apparent from inspection of the curve $Y(t)$, since its ordinates are proportional to the square of the frequency.

More generally speaking, when resorting to a transformed function relying on derivatives of a higher order, it is possible to cut out the above-referred constant. Thus, for instance, the derivative:

$$Y'(t) = u'(t)u''(t) - u(t)u'''(t)$$

has a value equal to zero as long as the curve defining $u(t)$ is substantially sinusoidal. However, it shows sudden impulses at each input of a "packet" of energy.

The single figure of the accompanying drawing illustrates the apparatus which allows obtaining the transformed function $Y$ of the function $U$; said function $U$ is supplied by the sources of seismic signal 1 such as a geophone or a magnetic track on which the seismogram supplied by the geophone is recorded.

The voltage produced by the source 1 passes first, if required, through a filter 2 which removes the undesired frequencies. The voltage at the output of the filter 2 is applied in parallel to the two calculating systems 3 and 4, each of which produces at its output one of the two terms of the equation defining the function Y.

The two voltages supplied by the calculating systems 3 and 4 are subtracted algebraically from one another through the subtractor 5 and the voltage thus obtained at the output of subtractor 5 is fed, optionally through a further filter 6 into a recording member 7 of any suitable type.

The components 1-2 and 5, 6, 7 are each known separately in the art and need not be described with any further detail.

As to the calculating systems 3 and 4, they include two differentiators, the voltages produced by which are then fed into a multiplier which forms the desired product to be fed into the subtractor 5.

In particular, the calculating system 3 includes differentiators 8 and 9 connected in parallel to the output of filter 2. The outputs of differentiators 8 and 9 are connected to inputs of multiplier 10 whose output feeds the minuend input of subtractor 5. Calculating system 4 includes the serially connected differentiators 11 and 12 wherein the input of the former is connected to the output of filter 2. The output of differentiator 12 is connected to one input of multiplier 13 whose other input is connected to the output of filter 2. The output of multiplier 13 is connected to the subtrahend input of subtractor 5.

The multipliers and differentiators are also well known in the art and, consequently, the calculating systems 3 and 4 do not require any further detailed description.

The filter 6 has for its object to cut out various stray or parasitic noises which are generally introduced into the circuit by the differentiators forming part of the calculating systems 3 and 4.

Obviously, the voltage fed by 1, is if required, previously amplified, so as to be brought to a suitable level; the amplifier may, if required, be associated with the filter 2.

Furthermore, when the derivative of the function Y is required it is merely necessary to interpose another differentiator between the subtractor 5 and the recording means 7. The required differentiator 14 is shown in dotted lines.

What I claim is:

1. Apparatus comprising means for generating an impulse in the ground, a source of seismic signals which are constituted by signals produced in response to said impulse which is generated in the ground, along with stray signals which are superimposed thereon, means coupled to said source of seismic signals for generating a first voltage signal as a function of time which is related to said seismic signals, first calculating means coupled to the first said means for generating a second voltage signal as a function of time which is the square of the first derivative of said first voltage signal with respect to time, second calculating means coupled to the first said means for generating a third voltage signal with respect to time which is the product of said first voltage signal and the second derivative of said first voltage signal with respect to time, and means for generating a fourth voltage signal which is the difference of said second and third voltage signals, said first calculating means comprising first and second differentiators, each including inputs for receiving said first voltage signal and outputs, and a multiplier including first and second inputs connected to the outputs of said differentiators respectively, said second calculating means comprising a double differentiator including an input for receiving said first voltage signal and an output, a multiplier including a first input for receiving said first voltage signal, a second input and an output, and means for connecting the output of said double differentiator to the second input of said multiplier.

2. The apparatus of claim 1 wherein said double differentiator comprises first and second serially connected differentiators.

3. Apparatus comprising means for generating an impulse in the ground, a source of a voltage signal representing seismic data, said signal being produced in response to said impulse generated in the ground, first differentiating means including a first input for receiving said voltage signal and a first output for transmitting a signal which is the time derivative of the signal received at said first input; second differentiating means including a second input for receiving said voltage signal and a second output for transmitting a signal which is the time derivative of the signal received at said second input; third differentiating means including a third input for receiving said voltage signal and a third output for transmitting a signal which is the time derivative of the signal received at said third input; fourth differentiating means including a fourth input and a fourth output for transmitting a signal which is the time derivative of the signal received at said fourth input; means for connecting said third output to said fourth input; a first multiplier means including fifth and sixth inputs and a fifth output; means connecting said first output to said fifth input; means for connecting said second output to said sixth input, a second multiplier means including seventh and eighth inputs and a sixth output; said seventh input being adapted to receive said voltage signal; means for connecting said fourth output to said eighth input; a subtractor means including ninth and tenth inputs and a seventh output; means for connecting said fifth output to said ninth input; and means for connecting said sixth output to said tenth input.

References Cited by the Examiner

UNITED STATES PATENTS

| | | | |
|---|---|---|---|
| 2,099,536 | 11/37 | Scherbatskoy et al. | 181—.5 |
| 2,161,764 | 6/39 | Minton | 181—.5 |
| 2,364,209 | 12/44 | Green | 181—.5 |
| 2,395,289 | 2/46 | Neufeld | 340—15.5 |
| 2,927,656 | 3/60 | Feagin et al. | 181—.5 |

SAMUEL FEINBERG, *Primary Examiner.*

CHESTER L. JUSTUS, NEIL C. READ, *Examiners.*